Fig. 1.

INVENTOR
JAMES H. BUCKNAM
BY
ATTORNEY

Patented June 18, 1946

2,402,522

UNITED STATES PATENT OFFICE 2,402,522

GAS GENERATING APPARATUS AND CONTROL SYSTEM THEREFOR

James H. Bucknam, Cranford, N. J., assignor to Union Carbide and Carbon Corporation, a corporation of New York Application December 28, 1939, Serial No. 311,253

19 Claims. (Cl. 48—190)

This invention relates to gas generating apparatus and control systems therefor, as well as to a method of controlling such apparatus, whereby a continuous, unfailing, and adequate supply of gas may be delivered at all times to meet widely varying demands or load requirements. More particularly, the invention relates to control systems for gas generating sets comprising a plurality of individual generator units, wherein the number of units operating at one time may be varied automatically in accordance with predetermined conditions of the load.

Need has arisen for a system of operation to be used with acetylene generators, particularly medium pressure acetylene generators, which will permit their use in operations where load requirements are such that ordinarily they could not be relied upon to give a continuous, unfailing, and adequate supply of acetylene. Examples of such operations are the recently developed processes of flame-cutting, flame-hardening, flame-softening, steel deseaming, and steel desurfacing, all of which consume large volumes of acetylene. Especially important in these operations is the fact that at no time must there be any interruption in the acetylene supply; and it is also imperative that any equipment designed for supplying acetylene gas to such operations be such as to require a minimum of attention in achieving its purpose.

Flexibility, likewise, is of prime importance in satisfactorily carrying out the previously mentioned operations. For example, in the oxygen desurfacing of steel billets, now widely practiced in the steel industry, very large volumes of acetylene are required for relatively short periods, after which the acetylene load requirement returns to a comparatively low normal rate of gas flow. The present invention provides extremely flexible operation by varying automatically the number of generator units operating simultaneously in accordance with predetermined conditions of load, while at the same time providing for the quick return to the supply of a comparatively low normal load by cutting out of operation any generator units not required to supply the low normal load.

Before the present invention, the supply of large volumes of acetylene continuously and without interruption could be accomplished only by providing two separate banks of generator units adapted to discharge gas to a common delivery conduit, one bank being operative to supply the load, and the other bank acting as a reserve to take up the load when the generators of the operating bank ran out of calcium carbide. Each bank comprises a plurality of concurrently operative generator units, discharging gas to the common delivery conduit. While one bank was in operation, it was necessary to allow the other bank to "float" on the line. This floating was done by setting the line pressure regulator of the reserve generator bank at a somewhat lower value than was being maintained by the line pressure regulator of the service generator bank. When the calcium carbide in the generator units of the service generator bank became exhausted, and the pressure of the gas discharged therefrom dropped, the reserve generator bank was cut in and picked up the load at a slightly reduced line pressure, which was then raised to the proper figure. The generators comprising the bank which was taken out of service then were recharged with calcium carbide and the recharged bank was allowed to float on the line at a low pressure, as was the reserve bank previously.

Although such a dual system sufficed where only continuity of supply was required, it was impossible to obtain satisfactory operation over widely fluctuating load requirements. Another disadvantage of the dual system was that some generator units in the service bank were apt to run out of calcium carbide before the other generators in the same bank. When this occurred, the result was that the remaining operative generators were required to carry a substantial overload. Such overloading is undesirable both from the operating and hazard standpoints. Furthermore, each time the bank of generators to serve as the reserve bank was recharged with calcium carbide, the line pressure regulator had to be set back to allow that bank to float on the line; and the line pressure regulators again had to be advanced when the reserve bank went into service. Such manipulation of regulators required the manual attention of an operator and consumed much time.

Among the objects of the present invention, therefore, are:

To provide gas generating apparatus and a control system therefor, as well as a method of controlling the operation of such apparatus, whereby a continuous, unfailing, and adequate supply of gas will be delivered at all times to meet widely varying demands or load requirements;

To provide a control system for a gas generating set comprising a plurality of gas generator units, as well as a method of controlling the operation of such set, whereby the number of units operating at one time may be varied automatically in accordance with the load requirements;

To provide flexible operation of such a gas generating set by varying automatically the number of generator units operating simultaneously in accordance with predetermined conditions of load, while at the same time providing for the quick return to the supply of a comparatively low normal load by cutting out of operation any generator units not required to supply the low normal load;

To provide a control system whereby a prime generator unit will operate continuously to supply a relatively low normal load, and whereby the other generator units automatically will become operative or inoperative successively and in sequence in accordance with the load requirement, as reflected by predetermined conditions of gas flow in a common delivery conduit;

To provide a control system whereby a substitute generator unit may be made operative in place of an inoperable generator unit at the predetermined condition of gas flow which normally would make operative the inoperable generator unit;

To provide a control system whereby one or more inoperable generator units may be skipped in sequence, and the burden of supplying the load at predetermined conditions of gas flow shifted to the generator units following the inoperable unit or units in sequence;

To provide a control system whereby one generator unit operates continuously as the prime unit, the other generator units in the set being operative supplementary thereto, and whereby the order of operation of the generator units may be indexed to make prime the next operable generator unit in sequence following the prime unit, when the prime unit becomes inoperable for any reason, such as exhaustion of the calcium carbide supply; and To provide such as control system whereby suitable signals will indicate the conditions of operation in the gas generating set.

The above and other objects will become apparent upon consideration of the following specification, taken in connection with the accompanying drawings, in which.

Although the principles of the present invention may be applied equally well to the control of generating sets for other kinds of gases, and to gas generating sets comprising any number of gas generator units arranged to discharge gas into a common delivery conduit, the control system of the invention will be described particularly, by way of example, as applied to an acetylene gas generating set comprising a series of four acetylene gas generators, three of which may operate concurrently, and the fourth of which is held in reserve.

Figure 2:
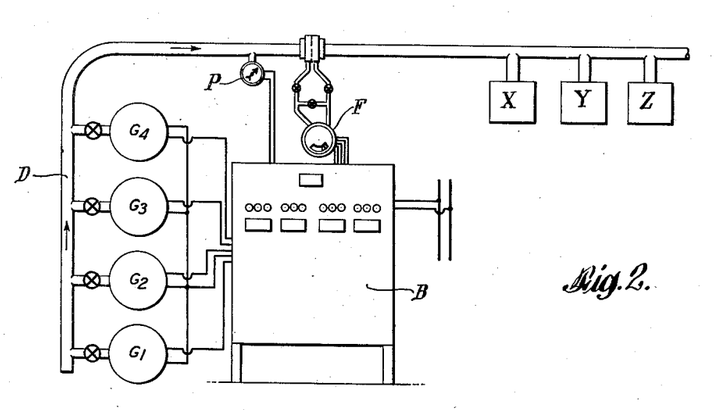
Fig. 2 is a diagrammatic view showing the relation between the gas generating apparatus, the gas consuming apparatus, and the control system.

Shown in Fig. 2 is acetylene gas generating apparatus comprising four acetylene generators $G_1$, $G_2$, $G_3$ and $G_4$, which may be of any of the well-known acetylene generator types wherein acetylene is generated by reacting calcium carbide with water. The individual generator units are arranged to discharge the gas generated therein through individual discharge ducts into the common delivery conduit D, which is adapted to deliver the gas to the load, as, for example, a plurality of gas consuming devices X, Y, Z, which may be steel desurfacing apparatus, oxyacetylene blowpipes, or similar devices. In the delivery conduit D is a pressure switch P, which is actuatable in response to the pressure of gas in the delivery conduit D to close contact when the gas pressure falls below a predetermined minimum value, and to maintain open contacts when the pressure is above this minimum. A flow meter F, also in the delivery conduit D, is provided with electrical contacts which are responsive to predetermined conditions of the gas flow in the delivery conduit D. By means of the electrical circuit of the control system of the invention, to be described more in detail hereinafter, and represented in Fig. 2 by the control board B, the flow meter F reacts in response to predetermined rates of gas flow in the delivery conduit D, to control automatically the operation of suitable control mechanisms associated with each generator unit whereby the generator units successively become operative or inoperative in accordance with predetermined conditions of load. Likewise, the pressure switch P automatically controls the operation of the control mechanisms in accordance with operating conditions within the units themselves.

By way of example, a gas generating set to which the control system of the present invention may be applied comprises four acetylene generator units having a nominal acetylene gas generating capacity of 1000 cu. ft./hr. each. During operation, to supply a variable load, the following elements will be regulated automatically:

(1) One of the generator units will be in operation continuously supplying the load requirement up to a predetermined rate of gas flow in the gas delivery conduit, such as 1000 cu. ft./hr. This generator is called the "prime" generator.

(2) When the prime generator unit currently in operation generating gas runs out of calcium carbide, or becomes inoperable for any other reason, a second generator unit will be placed in service as the prime unit, and the previously prime unit will be taken out of service.

(3) If the load requirement increases to a predetermined rate of gas flow, for instance 1000 cu. ft./hr., a second generator unit will be placed in service to operate concurrently with the prime generator.

(4) If, following the condition in (3) above, the load requirement decreases below a predetermined rate of gas flow, such as 800 cu. ft./hr., for example, the second generator will be cut out of service, and the prime generator will operate alone to supply the load requirement up to 1000 cu. ft./hr.

(5) If the load requirement exceeds the first predetermined increment in the rate of gas flow, such as 1000 cu. ft./hr., and two generator units therefore are in operation, a third generator unit will be cut into service to supply the load requirement at a second predetermined increment in the rate of gas flow, such as 2000 cu. ft./hr., and will operate concurrently with the generators previously operating.

(6) If, following the condition in (5) above, the load requirement drops below a predetermined rate of gas flow, for example 1800 cu. ft./hr., the third generator unit will be cut out of service; and this also may be followed in sequence by the cutting out of service of the second generator unit, as in (4) above.

(7) Suitable indicators, such as signal lights on a central control panel, will be operated to show which is the prime generator unit, and to show when the prime generator unit becomes inoperable for any reason.

One type of acetylene generator which may be used with the control system of the present invention is described and claimed in Patent No. 2,188,277, issued January 23, 1940, in the names of M. P. DeMotte, C. H. Baker, and R. C. Pierson. Medium pressure acetylene generators of the type described in the aforementioned patent, which are the type preferably used with the control system of the invention, ordinarily comprise a water reservoir, a chamber for calcium carbide located above the water reservoir, and mechanism controlled by the gas pressure in the generator for controlling the starting and stopping of the carbide feed to the water, as well as for regulating the rate of carbide feed. In such a generator, the regulation of gas generation ordinarily is accomplished by means of a calcium carbide feed-control valve, operated by a diaphragm which is responsive to the gas pressure in the generator to regulate the rate of carbide feed. One type of mechanism, which may be utilized with the control system of the present invention to control the operation of such a generator, comprises a compressed air-operated piston connected to the carbide feed valve diaphragm through a suitable linkage, and actuatable by compressed air admitted from the compressed air conduit 15 (shown in Fig. 1) through an electrically-motivated valve. Each unit in the set may be provided with such a mechanism operable through the respective electrically-motivated valves. It is evident, however, that other means for controlling the operation of the generator units may be resorted to with good results. For example, a motorized valve in the discharge duct of each generator unit could be opened or closed at will, in accordance with conditions in the electrical control circuit. The latter arrangement is particularly advantageous because the pressure in each unit is maintained even when the unit is inoperative. Thus, when any unit is made operative, the pressure of gas is already up and gas immediately may be discharged to the delivery conduit D at the required pressure, without the lag experienced when pressure must be built up to the required value.

Figure 1:
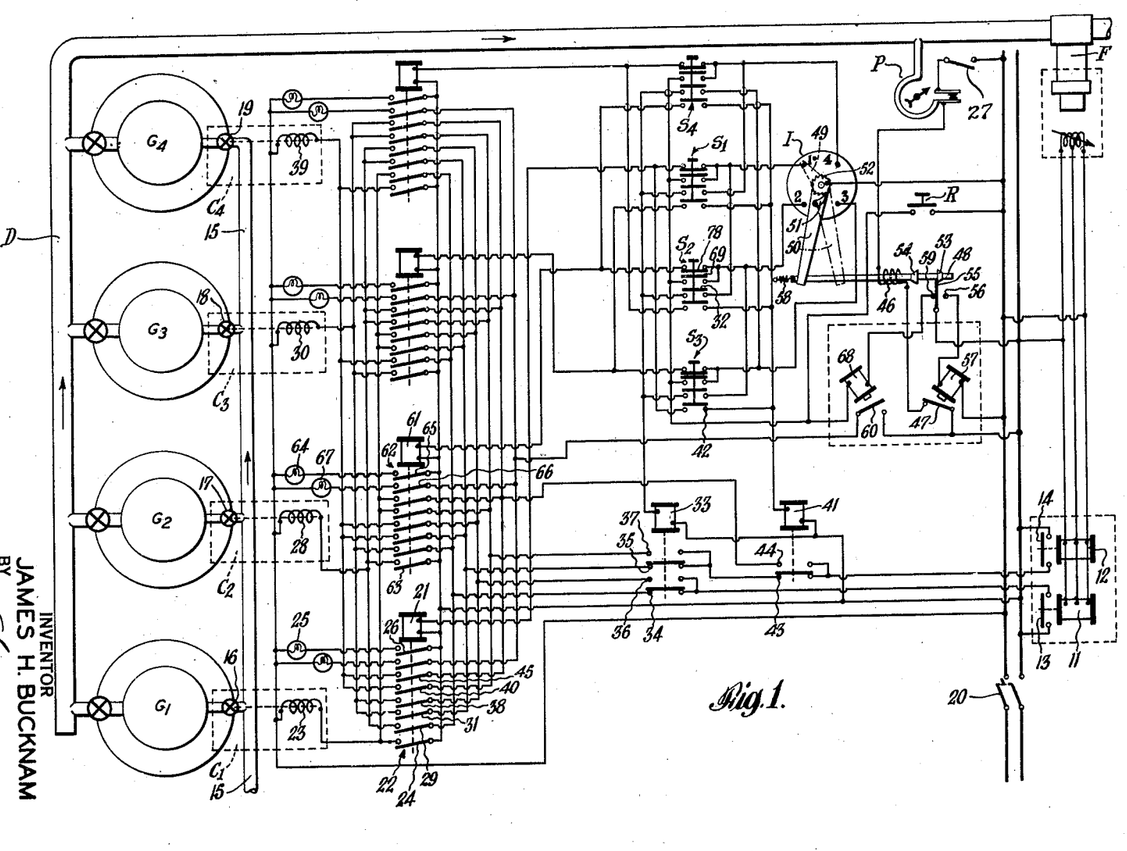
Fig. 1 is a diagrammatic view of the gas generating apparatus and control system of the present invention showing in detail the electrical control circuit.

The control system of the present invention is shown in detail in Fig. 1 as completely de-energized, with no acetylene generator unit operative to discharge gas to the delivery conduit D, and with the contact arm 49 of the indexing switch I resting on contact 1. Assuming that each of the generator units has been charged with calcium carbide and water, and is ready for operation, the switch 20 in the main electrical power line is closed manually, and the holding coil of relay 21, corresponding to generator unit $G_1$, becomes energized, actuating to closed position all the normally-open contacts of the multipole switch 22 which is operatively associated with unit $G_1$. The solenoid 23 of the control mechanism $C_1$ in circuit with the relay 21 is then energized through the closed contact 24 of the multipole switch 22 in the main solenoid circuit, and the compressed-air valve 16 is opened, thus starting the calcium carbide feed in the generator unit $G_1$ and commencing the discharge of acetylene gas therefrom to the delivery conduit D; and the circuit through a green signal light 25 is closed through the closed contact 26 to indicate that unit $G_1$ is prime. As soon as the gas pressure in the delivery conduit D has built up to a predetermined minimum value, for example 10 lb./sq. in., the normally-closed contacts of the pressure switch P automatically open, after which the single pole switch 27 in the lead to the switch P may be closed manually, thus putting the whole control system in condition for automatic operation.

As long as the demand or load requirement remains below the gas generating capacity of the prime generator $G_1$, for example 1000 cu. ft./hr., this one generator supplies the whole load. When the demand increases to a predetermined rate of gas flow, for example 1000 cu. ft./hr., above which prime unit $G_1$ would be overloaded if it continued to operate alone, the flow meter F energizes the holding coil of the flow-controlled relay 11 and closes the normally-open switch 13. Closing of the switch 13 thereupon closes a circuit to the solenoid 28 of the control mechanism $C_2$ associated with the generator unit $G_2$, through the closed contact 29 of the multipole switch 22, and makes operative the supplemental unit $G_2$ by opening the compressed-air valve 17 and starting the carbide feed in the generator. Generator units $G_1$ and $G_2$ then operate concurrently to supply the total load requirement as long as the load remains below their combined capacities. If, while the generators $G_1$ and $G_2$ are operating concurrently, the load falls to a predetermined value within the capacity of one generator alone, for example 800 cu. ft./hr., the holding coil of the relay 11 is de-energized by the flow meter F, the switch 13 opens, and the solenoid 28 is de-energized, thus closing the valve 17 and making inoperative the generator unit $G_2$. If, when the generator units $G_1$ and $G_2$ are operating concurrently, the load increases to a predetermined value exceeding the combined capacity of the generators $G_1$ and $G_2$, above which the generators $G_1$ and $G_2$ would be overloaded, the holding coil of the relay 12 is energized by the flow meter F, and the normally-open switch 14 is closed, thus energizing the solenoid 30 of the control mechanism $C_3$, associated with the $G_3$ generator unit, through the closed contact 31 of the multipole switch 22, and making operative the supplemental unit $G_3$ by opening the compressed air valve 18. If, when units $G_1$, $G_2$, and $G_3$ are operating concurrently, the demand for gas drops off and the rate of gas flow in the delivery conduit D falls to a predetermined decreased value, for example to 1800 cu. ft./hr., the relay 12 is de-energized, the switch 14 is opened, the solenoid 30 is de-energized, and the valve 18 closes, thus making inoperative the $G_3$ unit. In a similar manner, the unit $G_2$ is made inoperative if the rate of gas flow falls to a predetermined value, for example 800 cu./ft. hr., as previously described.

At times, a supplemental generator unit may become inoperable for some reason, such as a defective carbide feed valve, or exhaustion of the carbide supply. Suitable means, therefore, is provided for cutting out of sequence such an inoperable generator unit to prevent operation thereof, and shifting the burden of operation at predetermined increments in the load to the other supplemental generator units following in sequence. For example, if the generator unit $G_1$ is prime, and the generator unit $G_2$ becomes inoperable for any reason, the switch $S_2$ may be actuated manually from its normal position, thus closing the contact 32 and energizing the holding coil of the relay 33 to open the contacts 34 and 35 in the circuits to the control mechanisms of the units $G_2$ and $G_3$, respectively, and close the contacts 36 and 37 in the circuits to the control mechanisms of the units $G_3$ and $G_4$, respectively. When the contacts 36 and 37 are closed, therefore, closing of the switch 13 at the first predetermined increment in the rate of gas flow in the conduit D makes operative the generator $G_3$, as a substitute for the inoperable generator unit $G_2$, by closing the circuit to the control mechanism $C_3$ through the closed contact 38 of the multipole switch 22. Similarly, when the switch 14 is closed at the second predetermined increment in the rate of gas flow, the solenoid 39 of the control mechanism $C_4$, associated with the generator unit $G_4$, is energized through the closed contact 40 of the multipole switch 22, thus making operative unit $G_4$. The generators $G_4$ and $G_3$ become inoperative in reverse sequence as the rate of gas flow successively decreases below predetermined values and the switches 14 and 13 successively open, in the manner previously described. Similarly, when the $G_1$ generator unit is prime, and the $G_3$ generator unit becomes inoperable for any reason, manual movement of the switch $S_3$ away from its normal position energizes the holding coil of the relay 41 through the closed contact 42, opens the contact 43, and closes the contact 44. Thus, when the rate of gas flow in the delivery conduit rises to the predetermined increment of gas flow which normally would make operative the unit $G_3$, the generator unit $G_4$ is made operative by energizing the solenoid 39 of the control mechanism $C_4$ through the closed contact 45 of the multipole switch 22. Similarly, the generator unit $G_4$ is made inoperative when the rate of gas flow in the delivery conduit falls below a predetermined value, thus opening the switch 14, in the manner previously described.

From the foregoing description, it is evident that the control system of the present invention provides in a very satisfactory manner for the continuous, unfailing, and adequate supply of acetylene gas to satisfy widely fluctuating load requirements. In most cases, the normal load will be within the gas generating capacity of the prime generator unit operating alone, and the supplemental generator units will be made operative only intermittently to take care of unusually high temporary demands. Therefore, it is generally true that the prime generator unit will run out of calcium carbide and become inoperable before the exhaustion of carbide in any of the supplemental generator units. It is imperative, therefore, to cut out of service the prime generator as soon as the carbide charge becomes exhausted, and to cut into service as the prime generator the next unit in sequence. This operation, called indexing, is accomplished automatically through the agency of the pressure switch P, the contacts of which close when the gas pressure in the delivery conduit D falls below a predetermined minimum.

Assuming that the unit $G_1$ is the prime generator, and that the pressure of the gas flowing in the delivery conduit D has been maintained above a predetermined normal value, above which the contacts of the pressure switch P are open, operation of the generator set will continue satisfactorily in the manner previously described until the calcium carbide charge in the unit $G_1$ becomes exhausted, or the unit $G_1$ becomes inoperable for any other reason. When the pressure of the gas discharged from the unit $G_1$ falls below normal, because of exhaustion of the calcium carbide supply therein for example, the gas pressure in the delivery conduit D will also fall until a predetermined minimum pressure is reached. The contacts of the pressure switch P then will close, completing the electrical circuit through the solenoid 46 and the normally-closed switch 47. Upon energization of the solenoid 46, the armature 48 of the indexing switch I moves to the right in a continuous stroke, thus rotating counter-clockwise the switch arm 49 from the contact 1 to the contact 2, by means of the lever 50 bearing the pawl 51, which engages the ratchet 52 to produce the rotary switch motion.

A collar 53 on the armature 48 holds the two-way switch 55 against the contact 59, at the left, when the indexing switch is in ready position, as illustrated. A second collar 54 on the armature 48 is spaced from the collar 53 a sufficient distance so that, near the end of the indexing stroke of the armature 48, toward the right, the collar 54 engages the two-way switch 55 and urges it toward the right. As the indexing stroke is completed, or immediately thereafter, the collar 54 presses the switch 55 against the contact 56 and completes an electrical circuit through the holding coil of the relay 57, thus opening the normally-closed switch 47 and de-energizing the solenoid 46. On de-energization of the solenoid 46, the armature 48 is urged toward the left by the spring 58, thus restoring the lever 50 and pawl 51 to the ready position for the next time an indexing cycle is required, as well as returning the two-way switch 55 into engagement with the contact 59.

Advancing the indexing switch arm 49 from the contact 1 de-energizes the relay 21, opens the multipole switch 22 corresponding to unit $G_1$, and makes unit $G_1$ inoperative by de-energizing the solenoid 23 and closing the valve 16 of the control mechanism $C_1$. Engaging the contact 2 with the indexing switch arm 49 closes the electrical circuit through the holding coil of the relay 61 in circuit with the control mechanism $C_2$, and thereby closes all contacts of the multipole switch 62, which corresponds to and is operatively associated with the generator unit $G_2$. Thus, the solenoid 28 of the control mechanism $C_2$ is energized by the closing of the main circuit thereto through the contact 63 of the multipole switch 62, and unit $G_2$ becomes prime, as indicated by the illumination of the green light 64, the circuit through which has been closed by the contact 65 of the switch 62.

The normally-closed switch 47 in the circuit through the indexing solenoid 46 is interlocked with the normally-open switch 60 in such a way that, when one switch is open, the other always is closed. Thus, opening of the switch 47 closes the interlocked switch 60 and completes the electrical circuit through the closed contact 66 of the multipole switch 62, thus illuminating a red light 67, which shows on the instrument panel that the previously prime generator unit $G_1$ is now inoperable.

After the previously prime generator $G_1$ has been recharged with calcium carbide and made operable again, the manual re-set switch R may be closed manually, thus energizing the holding coil of the relay 68, reopening the switch 60, and extinguishing the red signal light 67; and at the same time the interlocked normally-closed switch 47 will reclose so that the electrical circuit through the indexing solenoid 46 again is prepared for an indexing cycle when the generator unit $G_2$ runs out of calcium carbide or otherwise becomes inoperable.

With the generator $G_2$ prime, sequential operation of the other generators at predetermined increments of load is in the same manner as previously described with generator $G_1$ prime. For example, unit $G_3$ is cut into service at the first predetermined increment in load, and unit $G_4$ is cut into service at the second predetermined increment in load. If unit $G_3$ is inoperable for any reason, unit $G_4$ is cut into service at the first predetermined increment of load, and unit $G_1$ is cut into service at the second predetermined increment of load by manually moving the switch $S_3$ which energizes the relay 33 (assuming that generator $G_1$ has been recharged with calcium carbide and made operable again). If unit $G_4$ is inoperable for any reason, unit $G_3$ is cut into service at the first predetermined increment of load, and unit $G_1$ is cut into service at the second predetermined increment of load by moving the switch $S_4$ which energizes the relay 41 (assuming that unit $G_1$ has been recharged with calcium carbide and made operable again).

If the next generator unit in sequence after the prime unit becomes inoperable for any reason, it may be prevented from becoming prime, when the already prime unit becomes inoperable, by actuating the one of the switches $S_1$, $S_2$, $S_3$ or $S_4$ which corresponds thereto, thereby causing the indexing switch I to make prime the succeeding unit in sequence. For instance, if unit $G_1$ is prime and unit $G_2$ becomes inoperable, actuating the switch $S_2$ will close the contact 69 thereof in a circuit through the relay 68, and will open the contact 78 in the circuit through the holding coil of the relay 61. Thus, when the prime unit $G_1$ becomes inoperable, the indexing switch is moved from contact 1 to contact 2, the switch 47 is opened, and the interlocked switch 60 is closed in the manner previously described. When the armature 48 is returned to ready position and the two-way switch 55 engages the contact 59, however, the solenoid 68 becomes energized to reopen the switch 60 and reclose the interlocked switch 47, because of the circuit through the closed contact 69 of the switch $S_2$ being completed. Therefore, as unit $G_2$ cannot become operative because the contact 78 of the switch $S_2$ is open, the low pressure in the delivery conduit D causes the pressure switch P to maintain closed contact and, as the switch 47 has been closed, the indexing switch I completes another indexing cycle, thereby rotating the switch arm 49 from the contact 2 to the contact 3, and making operative as the prime generator unit $G_3$.

Although the operation of the automatic control system of Fig. 1 has been described with units $G_1$ and $G_2$ prime successively, the control system of the invention functions in the same manner to make generator units $G_3$ and $G_4$ successively prime when the prime units preceding in sequence become inoperable, and no further detailed description therefore is necessary. For clarity, however, it is well to point out that, when generator $G_3$ is prime, the normal sequence of operation is $G_3$, $G_4$, $G_1$; and when unit $G_4$ is prime the normal sequence of operation is $G_4$, $G_1$, $G_2$. It is also evident from the preceding description that the multipole switch of the relay associated with the prime generator always is closed and the other multipole switches are open; and that the operation of all units is controlled through the electrical circuits passing through the closed contacts of the multipole switch of the relay operatively associated with the prime generator.

The embodiment of the control system of the present invention described in connection with Fig. 1 is practically fully automatic in operation, except that an operator's momentary attention is required for manipulating one of the switches $S_1$, $S_2$, $S_3$, or $S_4$ when one of the generator units becomes inoperable; and for manipulating the manual re-set switch R after recharging of an inoperable previously prime generator unit has been completed.

Figure 3:
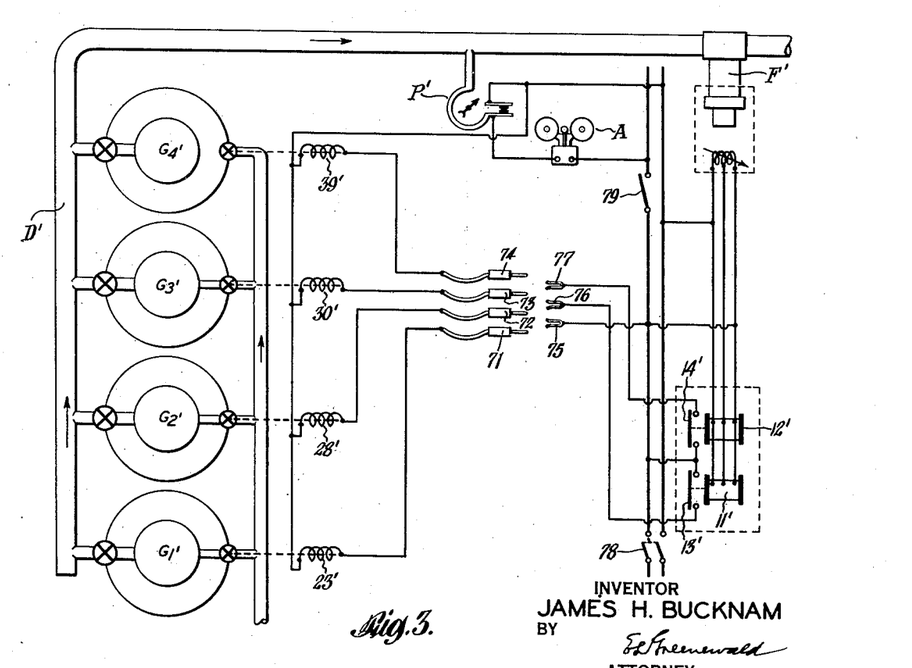
Fig. 3 is a diagrammatic view of gas generating apparatus and a modified form of the control system of the present invention.

Another embodiment of the control system of the present invention, as shown in Fig. 3, includes many of the advantageous features of the form of the invention shown in Fig. 1. Here, however, provision is made for a greater degree of manual operation.

As shown in Fig. 3, the generator set comprises, by way of example, four acetylene generator units $G_1'$, $G_2'$, $G_3'$, and $G_4'$, as in Fig. 1, controlled in the same way by solenoid actuated compressed air valves. Plug connectors 71, 72, 73, and 74 are provided in the electrical circuits of each of the solenoids 23', 28', 30', and 39', respectively; and three mating socket connectors 75, 76, and 77 are provided in as many circuits tapped off the main power line. The socket connector 75 is connected directly to the power line, so that the unit plugged into the socket 75 becomes the prime continuously operative unit. The socket connector 76 is connected to the power line through the normally-open switch 13' of the relay 11', so that the generator unit which is plugged into this socket 76 becomes the supplemental unit to operate at the first predetermined increment in load. The socket connector 77 is connected to the power line through the normally-open switch 14' of the relay 12', so that the unit which is plugged into the socket 77 becomes the supplemental unit to operate at the second predetermined increment in load.

Assuming that the plugs and sockets are interconnected in the desired manner, the generator set may be set in operation by first closing the switch 78 in the main power line to make operative the prime unit and discharge gas to the conduit D'. When the gas pressure in the conduit D' rises to a predetermined value, the contacts of the pressure switch P' open, and the switch 79 in the main power line then may be closed. Actuation of the relays 11' and 12' is accomplished by means of a flow meter F', in the same manner as in the embodiment shown in Fig. 1. When the prime generator unit, or one of the supplemental units, runs out of calcium carbide or becomes inoperable for any other reason, the pressure in the delivery conduit D' causes the pressure switch P' to close contact and sound the alarm A, thus calling the operator's attention to the condition. The operator then may cut out the inoperable generator, and cut in another generator as a substitute, simply by rearranging the plugs in the sockets.

The control system of the present invention has been described specifically as applied to gas generating apparatus comprising a plurality of acetylene gas generators. It is evident, however, that the principles of the invention may be applied to the control of apparatus for generating other kinds of gases. Furthermore, although the invention has been described specifically as applied to four-unit gas generating sets, this description has been purely by way of example, and the invention may be applied equally well to gas generating sets comprising either less or more generator units.

What is claimed is:

1. Gas supply apparatus comprising, in combination, a plurality of acetylene gas generator units; a single gas delivery conduit communicating with all of said units; and a control system for maintaining an adequate flow of gas from said units through said conduit to gas consuming means having variable gas requirements, such control system comprising control means so constructed and arranged as to initiate and maintain operation of one of said units to discharge gas into said conduit for supplying acetylene requirements within the capacity of said unit, and means, including a device connected into said conduit and responsive to gas flow therein, operable at a predetermined change in a condition of the gas flow resulting from an increase in the gas requirements of said consuming means so constructed and arranged as to render an additional unit operative concurrently with said first mentioned unit to discharge gas into said conduit.

2. Gas supply apparatus comprising, in combination, a plurality of acetylene gas generator units; a single gas delivery conduit communicating with all of said units; and a control system for maintaining an adequate flow of gas from said units through said conduit to gas consuming means having variable gas requirements, such control system comprising control means so constructed and arranged as to initiate and maintain operation of one of said units to discharge gas into said conduit for supplying acetylene requirements within the capacity of said unit, and means, including a device connected into said conduit and responsive to the rate of gas flow therein, operable at a predetermined increased rate of gas flow resulting from an increase in the gas requirements of said consuming means so constructed and arranged as to render an additional unit operative automatically concurrently with said first mentioned unit to discharge gas into said conduit.

3. A control system for gas generating apparatus including a plurality of acetylene generator units adapted to become operative successively to generate and discharge gas to a common delivery conduit to supply a load having variable gas requirements, said system comprising control means so constructed and arranged as to initiate and maintain operation of one of said units to discharge gas into such conduit for supplying gas requirements within the capacity of said unit; and means operable at a predetermined increased rate of gas flow in such conduit resulting from an increase in the gas requirements of said load so constructed and arranged as to render an additional unit operative automatically concurrently with said first mentioned unit to discharge gas into such conduit, said last named means including a control device responsive to rate of gas flow in such conduit.

4. A control system for gas generating apparatus including a plurality of generator units adapted to become operative successively in accordance with load to discharge gas into a common gas delivery conduit, comprising means for rendering one of said units operative continuously whereby said unit becomes the prime unit and gas generated therein is discharged into such conduit; means responsive to the gas flow in such conduit to render operative successively and in sequence one or more of the remaining generator units concurrently with said prime unit at successive predetermined conditions of gas flow resulting from increased demand for gas; control means responsive to a predetermined condition of the operation of any of said units operable to index the order of operation of said remaining units when said prime unit is inoperable and said predetermined condition is attained therein, whereby said prime unit is cut out of service and the first of said remaining units in sequence thereafter becomes operative continuously as the prime unit, said control means also acting, when said first of the remaining units in sequence is inoperable, to cut into service the next operable remaining unit thereafter as the prime unit; and means cooperating with said gas flow responsive means for rendering operative one of said plurality of units as a substitute unit in place of any of said remaining units.

5. A control system for gas generating apparatus including a plurality of acetylene generator units adapted to become operative successively to generate and discharge gas to a common delivery conduit to supply a load having variable gas requirements, said system comprising control means so constructed and arranged as to initiate and maintain operation of one of said units to discharge gas into such conduit for supplying gas requirements within the capacity of said unit; and means automatically operable at a predetermined increased rate of gas flow in such conduit resulting from an increase in the gas requirements of said load so constructed and arranged as to render an additional unit operative automatically concurrently with said first mentioned unit to discharge gas to such conduit, said last-named means also being so constructed and arranged as to render said additional unit inoperative thereafter at a predetermined decreased rate of gas flow in such conduit, said last-named means including a control device responsive to rate of gas flow in such conduit.

6. Gas supply apparatus comprising, in combination, a plurality of gas supply units adapted to supply gas to gas consuming means having variable gas requirements; a single gas delivery conduit communicating with each of said units; and a control system for maintaining an adequate flow of gas from said units through said conduit to such gas consuming means, such control system comprising means to render at least one of said units continuously operative and prime to discharge gas into said conduit, control means adapted to respond to predetermined conditions of the gas requirements of said gas consuming means to render one or more additional units operative to discharge gas to said conduit, and means cooperating with said control means for rendering operative a substitute unit in place of any of said additional units.

7. Gas supply apparatus comprising, in combination, a plurality of gas supply units adapted to supply gas to gas consuming means having variable gas requirements; a single gas delivery conduit communicating with each of said units; and a control system for maintaining an adequate flow of gas from said units through said conduit to such gas consuming means, such control system comprising means to render at least one of said units continuously operative and prime to discharge gas into said conduit, means adapted to respond to predetermined conditions of the gas requirements of such gas consuming means to render one or more additional units operative to discharge gas to said conduit, and means responsive to a predetermined condition of the operation of said prime unit to cut out of service said prime unit and to cut into continuous service in its place one of said additional units as the prime unit.

8. A control system for gas generating apparatus including a plurality of generator units adapted to become operative successively in accordance with load to discharge gas into a common gas delivery conduit, comprising means for rendering one of said units operative whereby gas is generated in such unit and discharged to such conduit; control means responsive to the gas flow in such conduit to render operative successively and in sequence supplemental units at predetermined successive increments in the rate of gas flow; and means cooperating with said control means operable to shift the duty of an inoperable supplemental unit to the following unit in sequence.

9. A control system for gas generating apparatus including a plurality of generator units adapted to become operative successively in accordance with load to discharge gas into a common gas delivery conduit, comprising electrically actuated control mechanisms severally operatively associated with said units; means for energizing one of said control mechanisms whereby the unit controlled thereby becomes operative to discharge gas to such conduit; means responsive to the gas flow in such conduit to close successively and in sequence electrical circuits of additional control mechanisms at successive predetermined increased rates of gas flow, rendering additional units operative; and connections in the electrical circuits of said additional control mechanisms whereby the circuit of the control mechanism of an inoperable unit may be opened and the circuit of the control mechanism of a substitute unit closed at that rate of gas flow at which the inoperable unit normally would be rendered operative.

10. A control system for gas generating apparatus including a plurality of generator units individually adapted to generate gas and discharge such gas into a common delivery conduit, such control system comprising: electrically actuated mechanisms severally associated with said units for individually controlling the operation of said units; a plurality of electrically operable relays severally in circuit with said mechanisms; means for energizing a first one of said relays to actuate one of said mechanisms and render operative the unit associated with such mechanism to generate gas and discharge such gas into said delivery conduit; and means constructed and arranged to de-energize such first relay to render inoperative such operating unit, and to energize a second one of such relays to actuate a second one of said mechanisms and render operative the unit associated with such second mechanism to generate gas and discharge such gas into said delivery conduit, such last-named means comprising an electrical switch controlling the circuits of at least said first and second relays and operable, in response to a predetermined minimum pressure of the gas in the unit that is currently in operation generating gas, to de-energize said first relay and to energize said second relay.

11. A control system for gas generating apparatus including at least three generator units individually adapted to generate gas and discharge such gas into a common delivery conduit, such control system comprising: electrically actuated mechanisms severally associated with said units for individually controlling the operation of said units; at least three electrically operable relays severally controlling the circuits of said mechanisms; means for energizing a first one of said relays to actuate one of said mechanisms and render operative a first unit associated with such mechanism to generate gas and discharge such gas into said delivery conduit; means constructed and arranged to de-energize such first relay to render inoperative such first unit, and to energize a second one of said relays to actuate a second one of said mechanisms and render operative a second unit to generate gas and discharge such gas into said delivery conduit, such last-named means comprising an electrical switch controlling the circuits of all of said relays and operable, in response to a predetermined minimum pressure of the gas in the unit that is currently in operation generating gas, to de-energize said first relay and to energize said second relay; and switch means controlling the circuits of certain of said relays and operable to cause said pressure-responsive switch, when the latter is operated, to de-energize said first relay and to energize a third one of said relays instead of said second relay, thereby actuating a third one of said mechanisms and rendering operative a third one of said units to generate gas and discharge such gas into said delivery conduit when operation of said second unit is undesirable.

12. A control system for gas generating apparatus including a plurality of generator units adapted to become operative successively in accordance with load to discharge gas into a common gas delivery conduit, comprising means for rendering one of said units operative continuously whereby said unit becomes the prime unit and gas generated therein is discharged into such delivery conduit; means responsive to the gas flow in such conduit to render operative successively and in sequence one or more supplemental units at successive predetermined conditions of gas flow; and means operable in response to a predetermined condition of the operation of said prime unit to index the order of operation of said units, whereby the next unit in sequence after said prime unit becomes operative continuously as the prime unit.

13. A control system for gas generating apparatus including a plurality of generator units adapted to become operative successively and in sequence in accordance with load to discharge gas into a common gas delivery conduit, comprising electrically actuated control mechanisms severally operatively associated with said units; a connector in the electrical circuit of each control mechanism; a plurality of mating connectors tapped off of a main power line, one of said mating connectors being connected directly to the main power line, whereby the control mechanism connected thereto renders continuously operative and prime the unit associated therewith; a normally-open switch in the circuit between each of the other mating connectors and the main power line; and means responsive to the gas flow in said conduit to close successively said switches at predetermined increased rates of gas flow whereby the control mechanisms connected thereto render operative successively the units associated therewith, and thereafter to reopen said switches successively at predetermined decreased rates of gas flow; said connectors being adapted to be selectively connected to any of said mating connectors.

14. A control system for gas generating apparatus including a plurality of generator units adapted to become operative successively in accordance with load to discharge gas into a common gas delivery conduit, comprising means for rendering one of said units operative continuously whereby said unit becomes the prime unit and gas generated therein is discharged into such delivery conduit; means responsive to the gas flow in such conduit to render operative successively and in sequence one or more supplemental units at successive predetermined conditions of gas flow; means responsive to a predetermined condition of the operation of said prime unit operable to index the order of operation of said units when said prime unit is inoperable and said predetermined condition is attached therein, whereby said prime unit is cut out of service and the next unit in sequence become operative continuously as the prime unit; and means cooperating with said gas flow responsive means for rendering operative a substitute unit in place of any of said supplemental units 15. A control system for gas generating apparatus including at least two generator units individually adapted to generate gas and discharge such gas into a common delivery conduit, such control system comprising electrically actuated mechanisms severally associated with said units for individually controlling the operation of said units; an electrically operable first relay controlling the circuit through one of said mechanisms; means for energizing said first relay to actuate one of said mechanisms and render operative the unit associated with such mechanism to generate gas and discharge such gas into said delivery conduit; and means constructed and arranged to control the actuation of a second one of said control mechanisms in accordance with the rate of gas flow in said delivery conduit, whereby said second mechanism is actuated at a predetermined increased rate of flow in said conduit and renders operative the unit associated with such second mechanism to generate gas and discharge such gas to said conduit concurrently with said first unit, and whereby, at a predetermined decreased rate of gas flow in said conduit thereafter, said second mechanism is actuated to render inoperative the unit associated therewith, said last-named means comprising a second relay including a normally-open switch adapted to control the circuit of said second mechanism through said first relay, and means responsive to the gas flow in said conduit to energize said second relay and close said normally-open switch at a predetermined increased rate of flow of the gas and, thereafter, to de-energize said second relay and reopen said normally-open switch at a predetermined decreased rate of gas flow.

16. A control system for gas generating apparatus including a series of at least three generator units individually adapted to generate gas and discharge such gas into a common delivery conduit, such control system comprising: electrically actuated mechanisms severally associated with said units for individually controlling the operation of said units; at least three electrically operable relays severally controlling the circuits of said mechanisms; means for energizing a first one of said relays to actuate a first one of said mechanisms and render operative and prime the unit associated with such mechanism to generate gas and discharge such gas into said delivery conduit; means constructed and arranged to control the actuation of an additional one of said control mechanisms in accordance with the rate of gas flow in said delivery conduit, whereby said additional mechanism is actuated at a predetermined increased rate of flow in said conduit and renders operative an additional unit associated with such additional mechanism to generate gas and discharge such gas to said conduit concurrently with said prime unit, and whereby at a predetermined decreased rate of gas flow in said conduit thereafter said additional mechanism is actuated to render inoperative said additional unit, said last-named means comprising a flow-controlled relay including a normally-open switch adapted to control individually the circuits of the several control mechanisms through the several first-named relays, said flow-controlled relay being adapted to control the circuit of a mechanism following in the series after that mechanism actuated when any one of said first-named relays is energized, and means responsive to the gas flow in said conduit to energize said flow-controlled relay and close said normally-open switch at a predetermined increased rate of gas flow and, thereafter, to de-energize said last-named relay and reopen said normally-open switch at a predetermined decreased rate of gas flow; means constructed and arranged for preventing the operation of said additional unit when operation of said additional unit is undesirable, and for rendering operative as a substitute the next unit in the series after said additional unit at such predetermined increased rate of gas flow in said delivery conduit, said last-named means comprising switch means controlling the electrical circuits through the mechanisms of certain of said generator units following in series after the prime unit, and operable to shift control by said flow-controlled relay from the control mechanism of said aforementioned additional unit to the control mechanism of said next unit in the series; means constructed and arranged to render inoperative such prime unit, and to render operative a second unit as the prime unit to generate gas and discharge such gas into said delivery conduit, said last-named means comprising an electrical switch controlling the circuits of certain of said relays and operable, in response to a predetermined minimum pressure of the gas in the prime unit that is currently in operation generating gas, to de-energize said first one of said first-mentioned relays and to energize a second one of said first-mentioned relays; and switch means controlling the circuits of certain of said relays and operable to cause said pressure-responsive switch, when the latter is operated, to de-energize the first one of said first-mentioned relays and to energize a third one of said first-mentioned relays instead of said second one of said first-mentioned relays, thereby actuating a third one of said mechanisms and rendering operative and prime a third one of said units to generate gas and discharge such gas into said delivery conduit when operation of said second unit is undesirable.

17. Acetylene gas generating apparatus comprising, in combination, a plurality of medium-pressure acetylene generators adapted to generate acetylene by the reaction of calcium carbide with water, each of said generators comprising a water reservoir, a carbide chamber, and mechanism controlled by the gas pressure in said generator regulating the feed of carbide into said reservoir and controlling the starting and stopping of such carbide feed; a single gas delivery conduit communicating with all of said generators; and an automatic control system for controlling the operation of said generators to deliver an adequate supply of gas to gas-consuming apparatus having a widely variable demand, said control system comprising control means for initially actuating one of said mechanisms to start the feed of carbide in a first one of said generators whereby gas is generated in such generator and discharged into said conduit, and control means responsive to the rate of flow of gas in said conduit to automatically controlling actuation of the carbide feed mechanisms of one or more additional generators to control the starting and stopping of the carbide feed in such one or more additional generators successively in accordance with successive predetermined increased or decreased rates of gas flow in said conduit, whereby said one or more additional generators, when operating, discharge gas to said delivery conduit concurrently with said first generator.

18. An acetylene supply system adapted to supply acetylene to gas consuming apparatus having variable gas requirements, comprising at least three acetylene generators, each provided with a discharge duct; a single gas delivery conduit connecting all of said ducts; a separate valve associated with each generator operable to control the starting and stopping of acetylene generation therein; an electrically operated control system operable to control the opening and closing of each of said valves and including means for operating the valve associated with a first generator to start the continuous generation of gas therein; a device, responsive to the rate of gas flow in said delivery conduit, operable on said control system; a first relay, responsive to said last-named device, to operate through said control system at a predetermined increased rate of gas flow in said delivery conduit the valve associated with a second generator to start the generation of gas therein concurrently with said first generator, and at a predetermined increased rate of gas flow thereafter to stop the generation of gas therein; a device, responsive to changes in the gas pressure in said first generator, connected to and operable on said control system; indexing relays operable by said last-mentioned pressure-responsive device at a predetermined minimum gas pressure to operate the valve associated with said first generator to stop the generation of gas therein and to operate the valve associated with said second generator to start the continuous generation of gas therein, said indexing relays also being operable on said first relay to cause said first relay thereafter to operate the valve associated with a third generator to start the generation of gas therein at said predetermined increased rate of gas flow in said delivery conduit.

19. In a control system for gas generating apparatus including a plurality of generator units adapted to become operative successively and in sequence to discharge gas to a common gas delivery conduit: means for rendering one of said units operative continuously whereby gas is generated therein and discharged to such conduit; means responsive to the gas flow in such conduit to render operative successively one or more additional units at successive predetermined conditions of the gas flow resulting from increased demand for gas; control means operable automatically in response to a predetermined condition of the operation of said continuously operative unit to cut out of service said continuously operative unit when the latter becomes inoperable, and to cut into continuous service in its place the next unit in sequence thereto; and additional control means adapted to be actuated when said next unit is inoperable, and so cooperating with said first named control means that when said continuously operative unit becomes inoperable and is cut out of service, the second unit in sequence thereafter is cut into service as the continuously operative unit instead of said next unit.

JAMES H. BUCKNAM.

Certificate of Correction

Patent No. 2,402,522.   June 18, 1946.

JAMES H. BUCKNAM

It is hereby certified that errors appear in the printed specification of the above numbered patent requiring correction as follows: Column 2, line 2, for "comprises" read *comprised*; column 3, line 43, for "such as" read *such a*; column 15, line 19, claim 14, for "attached" read *attained*; line 21, same claim, for "become" read *becomes*; column 18, line 1, claim 18, for "increased" read *decreased*; and that the said Letters Patent should be read with these corrections therein that the same may conform to the record of the case in the Patent Office.

Signed and sealed this 17th day of September, A. D. 1946.

[SEAL]

LESLIE FRAZER,
*First Assistant Commissioner of Patents.*